Sept. 4, 1928.   H. A. SELAH   1,683,416

CONDUIT FITTING

Filed Aug. 31, 1925

INVENTOR.
Howard A. Selah
ATTORNEYS.

Patented Sept. 4, 1928.

1,683,416

UNITED STATES PATENT OFFICE.

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed August 31, 1925. Serial No. 53,482.

This invention is designed to improve conduit fittings, particularly threadless conduit fittings. It is desirable in operating threadless fittings to provide a collapsing sleeve for engaging the conduit which is clamped on the conduit through the action of a nut and in the present invention the fitting in its action tends to lock the nut in place.

It is also desirable to provide such fittings with means for penetrating the enamel on the conduit so as to complete the electric connection between the conduit and the fitting. The present invention is designed to improve fittings as to this feature. Other features and details of the invention will appear from the specification and claim.

The invention is illustrated in the accompanying drawings as follows:—

Figure 1:
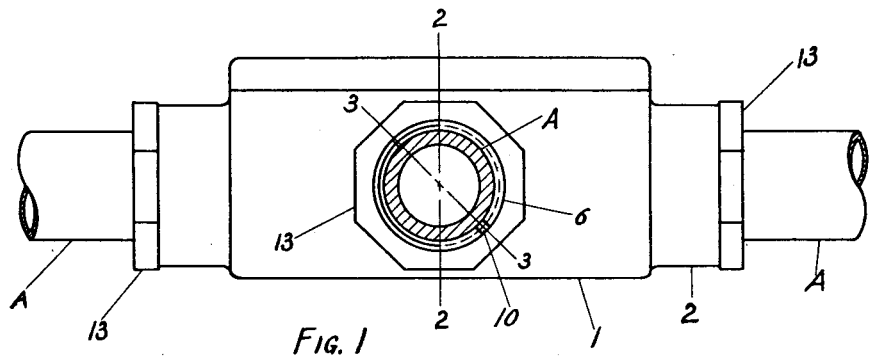

Fig. 1 shows a side elevation of a conduit box.

Figure 2:
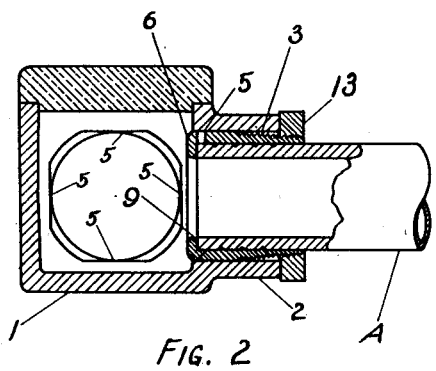
Figure 3:
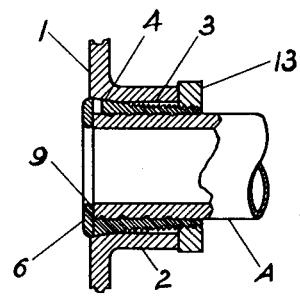
Figure 5:
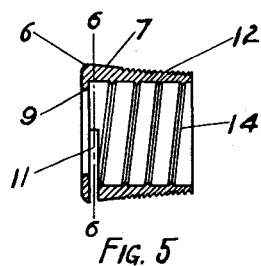
Figure 4:
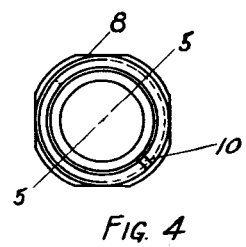
Figure 6:
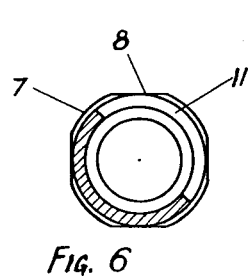
Figure 7:
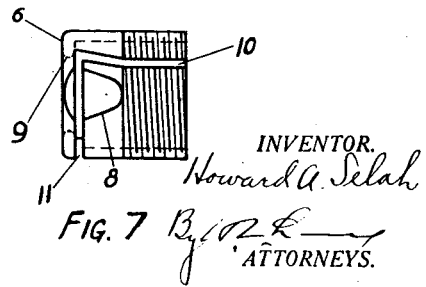

Fig. 2 a section on the line 2—2 in Fig. 1.
Fig. 3 a section on the line 3—3 in Fig. 1.
Fig. 4 an end view of the collapsing sleeve.
Fig. 5 a section on the line 5—5 in Fig. 4.
Fig. 6 a section on the line 6—6 in Fig. 5.
Fig. 7 an elevation of the collapsing or contractible sleeve.

1 marks the conduit box. This is provided with several outlet openings 2 from which extend the conduits A. The outlets have openings 3 which have tapered portions 4 at their rear end with flat portions 5 between the tapered portions.

A contractible sleeve 6 is arranged in the opening 3. It has a tapered end 7 engaging the tapered surface 4 and the flat surfaces 8 arranged to engage the flat surfaces 5 to hold the sleeve from turning. The sleeve is provided with a shoulder 9 at its inner end and this forms a complete annulus so that the conductor as it is drawn over it is not subjected to the action of any sharp or cutting edge.

An axial slot 10 is cut into the sleeve from the outer end and a circumferential slot 11 extends from the inner end of the slot 10. A screw thread 12 is arranged on the outer end of the sleeve and a nut 13 operates on this screw thread and against the end of the outlet thus drawing the sleeve into the opening and contracting the same so as to engage and clamp the conduit A. The circumferential slot 11 extends in a direction from the longitudinal slot opposite to the pitch of the thread 12. As a result the nut as it is screwed up on the sleeve tends to contract or bend inwardly the flexible portion of the sleeve in the angle between the two slots. With this arrangement the flexible edge operates to some extent as a lock nut as with the reversal of the movement of the nut the frictional engagement tends to expand this free portion of the sleeve and this expansion tends to lock the nut against turning so that the device in effect forms a lock for the nut.

It is desirable to provide the contracting sleeve with means for penetrating the enamel on the ordinary conduit so that an electric connection may be established. This has heretofore been accomplished by annular longitudinal ribs. There is quite a variation in the outside diameter of conduits. It is desirable to make the sleeve with as close a fit as is practical. In consequence some of the larger pieces of conduit require some force to make them enter the sleeve. In the present device I have provided the indenting rib 14 and arranged it in the form of a screw spiral so that as the enlarged conduit is forced into the sleeve its complete entry into the sleeve may be more readily accomplished by twisting the conduit and screwing it into place. This cuts a thread, as it were, through the enamel often penetrating slightly into the conduit itself and the pitch draws the conduit in as it is turned.

What I claim as new is:—

In a conduit fitting, the combination of a body having a conduit-receiving opening; a sleeve in the opening having its inner end in the form of a continuous annular wall, said sleeve having a slot extending from its outer end inwardly terminating in a circumferential slot and a screw thread on its outer end, the circumferential slot extending in a direction opposite to the tightening direction of the screw thread, the walls of the opening and sleeve having wedging surfaces brought into engagement by the endwise movement of the sleeve; and a nut on the screw threads at the outer end of the sleeve operating against the body and adapted to effect the contraction of the sleeve.

In testimony whereof I have hereunto set my hand.

HOWARD A. SELAH.